(12) United States Patent
Ou et al.

(10) Patent No.: US 11,797,447 B2
(45) Date of Patent: Oct. 24, 2023

(54) EFFICIENT CACHING AND DATA ACCESS TO A REMOTE DATA LAKE IN A LARGE SCALE DATA PROCESSING ENVIRONMENT

(71) Applicant: Hewlett Packard Enterprise Development LP, Houston, TX (US)

(72) Inventors: Xiongbing Ou, Santa Clara, CA (US); Thomas Anthony Phelan, Santa Clara, CA (US); David Lee, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/204,899

(22) Filed: Mar. 17, 2021

(65) Prior Publication Data
US 2022/0300422 A1    Sep. 22, 2022

(51) Int. Cl.
| | | |
|---|---|---|
| G06F 12/0811 | (2016.01) | |
| G06F 16/182 | (2019.01) | |
| G06F 12/121 | (2016.01) | |
| G06F 9/54 | (2006.01) | |

(52) U.S. Cl.
CPC ........ G06F 12/0811 (2013.01); G06F 12/121 (2013.01); G06F 16/182 (2019.01); G06F 9/541 (2013.01); G06F 2212/1021 (2013.01)

(58) Field of Classification Search
None
See application file for complete search history.

(56) References Cited

U.S. PATENT DOCUMENTS

| | | |
|---|---|---|
| 8,332,362 B2 | 12/2012 | McGovern et al. |
| 9,483,310 B2 | 11/2016 | Moretti |
| 9,921,866 B2 | 3/2018 | Ganguli et al. |
| 10,055,254 B2 | 8/2018 | Phelan et al. |
| 10,061,713 B2 | 8/2018 | Moretti |
| 10,296,396 B2 | 5/2019 | Phelan et al. |
| 10,482,062 B1 * | 11/2019 | Muniswamy Reddy ............... G06F 3/061 |

(Continued)

OTHER PUBLICATIONS

A. Tridgell and P. Mackerras, "rsync(1) man page," 2020, pp. 1-67, Retrieved from the Internet on Oct. 19, 2020 at URL: <download.samba.org/pub/rsync/rsync.1>.

(Continued)

*Primary Examiner* — William E. Baughman
(74) *Attorney, Agent, or Firm* — Mauriel Kapouytian Woods LLP (57) ABSTRACT

Embodiments described herein are generally directed to caching and data access improvements in a large scale data processing environment. According to an example, an agent running on a first worker node of a cluster receives a read request from a task. The worker node of the cluster to which the data at issue is mapped is identified. When the first worker node is the identified worker node, it is determined whether its cache contains the data; if so, the data is fetched from a remote data lake and the agent locally caches the data; otherwise, when the identified worker node is another worker node of the compute cluster, the data is fetched from a remote agent of that worker node. The agent responds to the read request with cached data, data returned by the remote data lake, or data returned by the remote data agent as the case may be.

19 Claims, 6 Drawing Sheets

(56) References Cited

U.S. PATENT DOCUMENTS

| | | | |
|---|---|---|---|
| 10,540,212 B2 | 1/2020 | Feng et al. | |
| 10,757,177 B1 | 8/2020 | Wang et al. | |
| 2002/0133537 A1* | 9/2002 | Lau | H04L 67/1008 709/219 |
| 2019/0132415 A1* | 5/2019 | Viswanathan | H04L 67/289 |
| 2020/0348882 A1* | 11/2020 | Muthiah | G06F 12/0868 |
| 2020/0349163 A1* | 11/2020 | Nadeau | G06F 16/182 |
| 2021/0173714 A1* | 6/2021 | Huang | G06F 16/182 |

OTHER PUBLICATIONS

Alexâ Nelson, "[Patch] Expose Ceph Data Location Information to Hadoop," Nov. 23, 2010, pp. 1-14, Retrieved from the Internet on Oct. 19, 2020 at URL: <spinics.net/lists/ceph-devel/msg01142.html>.

Cloudera.com, "Advantages of Separating Compute and Data Resources," 2020, pp. 1-2, Retrieved from the Internet on Nov. 3, 2020 at URL: <docs.cloudera.com/cdp-private-cloudbase/7.1.3/concepts/topics/cm-separating-compute-data.html>.

Swiftteam, "Swift Documentation," Oct. 20, 2020, pp. 1-770, Release 2.27.0.dev24.

Xplenty, Inc., "StreamedFileSystem (Cascading 3.3.0)," 2015, pp. 1-5, Retrieved from the Internet on Oct. 19, 2020 at URL: <docs.cascading.org/cascading/3.3/javadoc/cascading-hadoop2-io/cascading/tap/hadoop/io/StreamedFileSystem.html>.

Zhenhua Guo et al., "Investigation of Data Locality in MapReduce," Nov. 25, 2011, pp. 1-8, Indiana University of Bloomington, USA.

* cited by examiner

EFFICIENT CACHING AND DATA ACCESS TO A REMOTE DATA LAKE IN A LARGE SCALE DATA PROCESSING ENVIRONMENT

BACKGROUND

Large scale data processing environments (e.g., environments employing Apache Hadoop, Apache Spark, or other big data frameworks), facilitate the use of a distributed cluster of host systems to solve problems involving massive amounts of data and computation. In traditional large scale data processing environments, a data node and a compute node are deployed on the same host system (e.g., worker node) of the distributed cluster. When a file is stored in a traditional large scale data processing environment, it is decomposed into multiple data blocks and the data blocks are distributed among and stored within multiple data nodes of the distributed cluster. Similarly, when a job is submitted to the large scale data processing environment, the job is decomposed into many compute tasks that may be run on multiple compute nodes concurrently in the distributed cluster.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to caching and data access improvements in a large scale data processing environment with separate compute and storage deployments. Numerous specific details are set forth in order to provide a thorough understanding of example embodiments. It will be apparent, however, to one skilled in the art that embodiments described herein may be practiced without some of these specific details.

In the context of a traditional large scale data processing environment having a tightly coupled compute and storage deployment, a resource manager (e.g., Yet Another Resource Negotiator (YARN) or other job scheduler) may rely on the location of distributed data blocks of an input file among data nodes within a compute cluster to make decisions regarding assignment of compute tasks to compute nodes. For example, the resource manager may request, from a Hadoop File System (HDFS), addresses (e.g., Internet Protocol (IP) addresses/hostnames) of the worker nodes running the data node(s) to which data blocks have been distributed and then assign compute tasks to corresponding compute nodes running on the worker nodes based on the locations of the data blocks. In this manner, efficiencies provided by data locality may be achieved, including improving the performance of data processing by avoiding data movement; however, such tight coupling between data nodes and compute nodes may require both to be scaled despite the fact that only one of them may represent the bottleneck. This unnecessary coupling also creates inconveniences for data management and data sharing.

With the increasing availability of network bandwidth, large scale data processing environments having separate compute and storage architectures have become more prevalent. For example, separate data lakes may be deployed for data storage and sharing and a separate compute cluster may be deployed on demand to run compute tasks. In this manner, the data lake and compute cluster can be extended independently; however, the decoupling of the compute and storage architectures results in random assignment of compute tasks by the resource manager as the address of an input data block of an input file (stored in a remote data lake) for a given compute task no longer corresponds to a worker node within the compute cluster, but rather to the remote data lake.

Various embodiments described herein seek to control how compute tasks are scheduled and improve performance in the context of a large scale data processing environment having separate compute and storage architectures. For example, when a worker node executes a compute task, the worker node may access data from a remote data lake through a local data agent that implements an Application Programming Interface (API) (e.g., a RDFS-compatible API) and proxies data access requests to the remote data lake by transforming data access requests into an API supported by the remote data lake. When the local data agent receives a data read request from the compute task, the local data agent may read the data block from the remote data lake. After the local data agent receives the data blocks from the remote data lake, the local data agent may cache the data locally for later usage. Because the big data approach follows a "write once, read many" pattern, the cached data can reduce the latency or cost to fetch the data from remote data lake and improve performance.

In some cases, when a worker node of a compute cluster of a large scale data processing environment that has a data block of an input file locally cached does not have enough compute resources, the resource manager may assign the corresponding compute task for that data block to another worker node within the compute cluster. In order to conserve storage and/or memory resources within the computer cluster, it is desirable to maintain only one cached copy of any given data block within the compute cluster. According to one embodiment, duplicate caching of data blocks is avoided by intelligent processing of read requests by respective data agents of the worker nodes. A first data agent running on a first worker node receives a read request from a compute task running on the first worker node. A particular worker node of the compute cluster is identified to which a data block containing data specified by the read request is mapped. When the particular worker node is the first worker node: (i) it is determined whether a local cache exists within the first worker node that contains the data block; (ii) when the determination is affirmative, the first data agent responds to the read request by serving the data from the local cache; otherwise: (a) the data block is fetched by the first data agent from a remote data lake; (b) the first data agent responds to the read request by serving the data from the fetched data block; and (c) the fetched data block is cached within the local cache. When the particular worker node is a second worker node of the compute cluster, duplicate caching of data is avoided by, the first data agent: (i) fetching the data from a second data agent running on the second worker node; and (ii) responding to the read request by returning the fetched data.

Terminology

A "host system" or "worker node" generally refers to one or more physical computers, virtual computers, or virtualized environments. Non-limiting examples of a worker node include one or more server computer systems, cloud-based computers, a cloud-based cluster of computers, virtual machine instances, and containers.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, the phrase "large scale data processing environment" refers to a data processing environment that facilitates the distributed processing of large data sets, for example, across one or more clusters of host systems. Non-limiting examples of large scale data processing environments include as-as-service data processing environments, whether on-premises, in the cloud, or in a hybrid Information Technology (IT) architecture, specifically designed to accommodate big data (e.g., a large volume of data on the order of terabytes or petabytes) by employing a big data framework (e.g., Apache Hadoop or Apache Spark).

Reference in the specification to "one embodiment" or "an embodiment" means that a particular feature, structure, or characteristic described in connection with the embodiment can be included in at least one embodiment of the invention. The appearances of the phrase "in one embodiment" are not necessarily all referring to the same embodiment.

Figure 1:
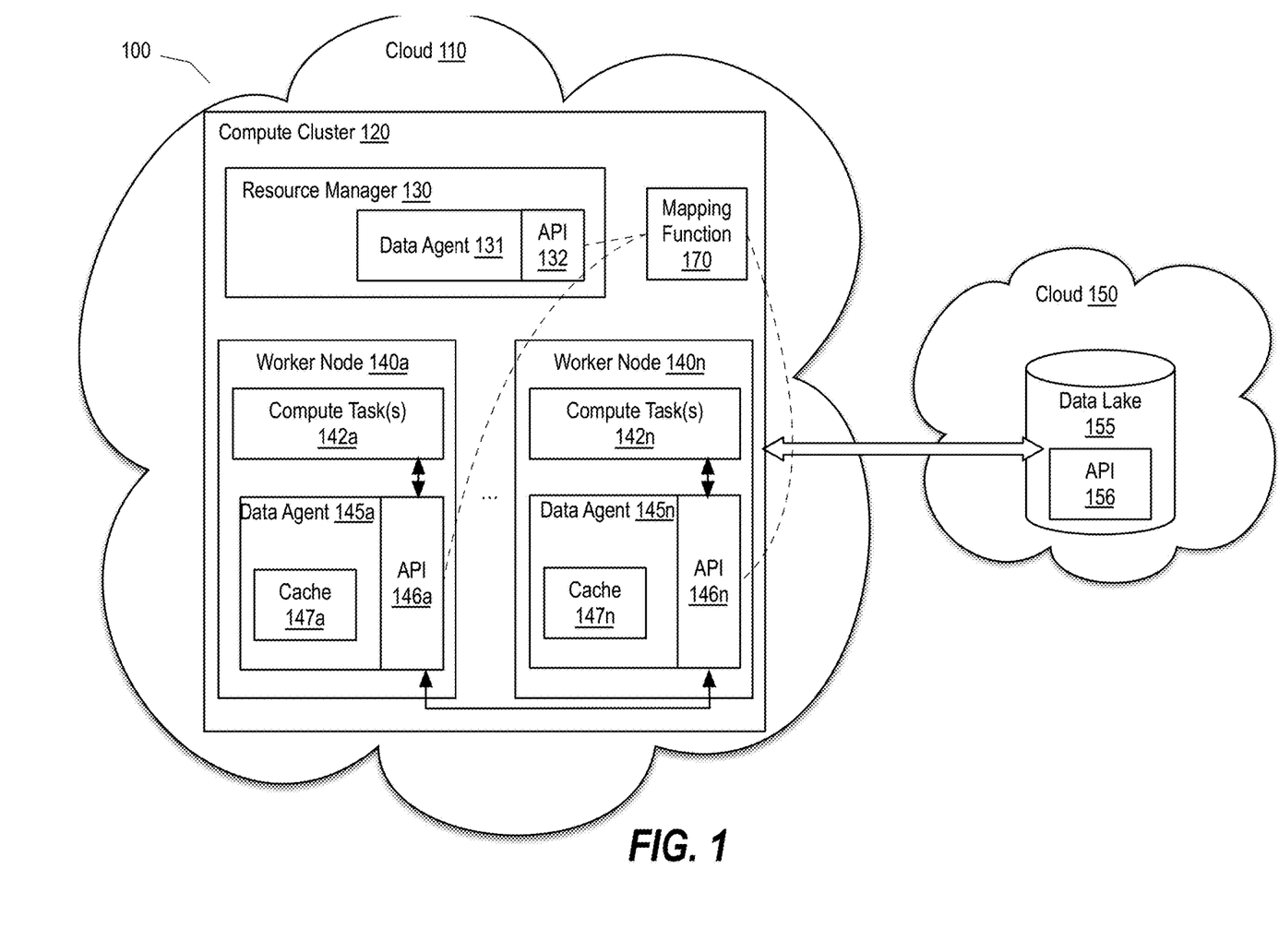
FIG. 1 shows a high-level block diagram illustrating a large scale data processing environment with separate compute and storage deployments in accordance with an example embodiment.

FIG. 1 shows a high-level block diagram illustrating a large scale data processing environment 100 with separate compute and storage deployments in accordance with an example embodiment. In the context of the present example, a compute cluster (e.g., compute cluster 120), representing a compute deployment separate and independent from the storage deployment, may be deployed on demand within a cloud (e.g., cloud 110) to run compute tasks (e.g., compute tasks 142a-n) for processing a large volume of data residing within one or more remote data lakes (e.g., data lake 155 within cloud 150), representing the separate and independent storage deployment. As noted above, such a large scale data processing environment allows storage resources and compute resources to be scaled up or down independently.

As described further below with reference to FIG. 2, a mapping function 170 may be provided within API 132 and APIs 146a-n to map a particular compute task and the corresponding data block of an input file on which the particular compute task is to operate to the same worker node, respectively. As such, despite the fact that the data upon which the compute tasks operate is stored remotely (e.g., in data lake 155), data locality efficiencies may be achieved via local caching by distributing the compute tasks among the worker nodes in accordance with a common mapping function (mapping function 170).

Non-limiting examples of the types of jobs that may be run by the compute cluster include those involving big data analytics and artificial intelligence/machine learning (AI/ML). In order to process the large data sets (e.g., on the order of terabytes or petabytes) typical for big data frameworks, multiple compute tasks (e.g., compute tasks 142a-n) may each be assigned to process a portion of a particular input file. According to one embodiment, the compute cluster includes a resource manager (e.g., resource manager 130) and multiple worker nodes (e.g., worker nodes 140a-n). The resource manager may be responsible for receiving information regarding jobs to be run on the compute cluster 120, decomposing the jobs into corresponding compute tasks, and scheduling the compute tasks on appropriate worker nodes. Depending upon the particular implementation, the resource manager may be Yet Another Resource Negotiator (YARN) or another type of job scheduler. The resource manager 130 may access information regarding an input file on which a job operates via an API 132 of a data agent 131. According to one embodiment, the API 132 proxies requests regarding files made by the resource manager to the remote data lake by transforming the requests into appropriate calls to an API (e.g., API 156) supported by the remote data lake. As described in further detail below, in order to facilitate job scheduling by the resource manager, the API 132 may implement a subset of methods supported by an HDFS-compatible API, including, for example, a getFileBlock-Locations( ) method, which returns an array containing hostnames, offset and size of portions of a given file.

In the context of the present example, each worker node includes a data agent (e.g., data agent 145a-n). Similar to the data agent 131, the data agents may each provide an API (e.g., API 146a-n) though which the compute tasks may request access to the data on which they operate. According to one embodiment, the data agents may hide the fact that the data upon which the compute tasks are operating is stored remotely, for example, by implementing the API in the form of an HDFS-compatible API that proxies data access requests made by the compute tasks to the remote data lake and communicates with the remote data lake with a protocol supported by the remote data lake. To the extent the API 156 provided by the data lake 155 differs from that of the APIs exposed by the data agents, the APIs 146a-n may perform appropriate translations between the two APIs. For example, the API 156 provided by the data lake 155 may be an HDFS-compatible API, a Network File System (NFS)-compatible interface, a Simple Storage Service (S3)-compatible API, a Google Cloud Storage (GCS)-compatible API, a Microsoft Azure storage service-compatible API, or one compatible with other current or future cloud storage APIs. In this manner, the compute tasks may be shielded from details regarding the actual stored location of the data upon which the compute tasks operate and the protocol used to access the data.

Additionally, the data agents may each maintain a cache (e.g., caches 147a-n). For example, after a data agent retrieves a data block from the remote data lake on behalf of a particular compute task, the data agent may cache the data block locally for later usage. Given the typical big data pattern of data access involving a high ratio of reads to writes, use of the local caches may reduce the latency to fetch data from remote data lake, thereby also improving performance. The caches may also result in lower cost when the remote data lake represents cloud storage by reducing requests and other traffic to the cloud storage. Further details regarding a novel caching mechanism that is intended to limit the number of cached copies of the same data block is described further below with reference to FIG. 4. For example, in one embodiment, in order to conserve memory and/or storage resources within the computer cluster, the number of cached copies of the same data block may be limited to one.

The clouds 110 and 150 may be in various forms, including private, public, and/or hybrid clouds. For example, either or both clouds 110 and 150 may make use of IT resources of an enterprise data center (e.g., an on-premise data center) that is owned and operated by an organization or a data center managed by a third party (or a managed service provider) on behalf of the organization, which may lease the equipment and infrastructure. Alternatively, either or both of clouds 110 and 150 may represent a colocation data center in which an organization rents space of a facility owned by a third party and located off premise. While in the context of the present example, the clouds 110 and 150 are shown at a high-level, those of ordinary skill in the art will appreciate additional IT infrastructure may be included.

In various examples described herein, reference may be made to a local data agent and/or a remote data agent. In such examples, "local" and "remote" are from the perspective of a particular worker node in the compute cluster with the local data agent referring to the data agent running on the particular worker node and the remote data agent referring to a data agent running on another worker node within the compute cluster.

Figure 2:
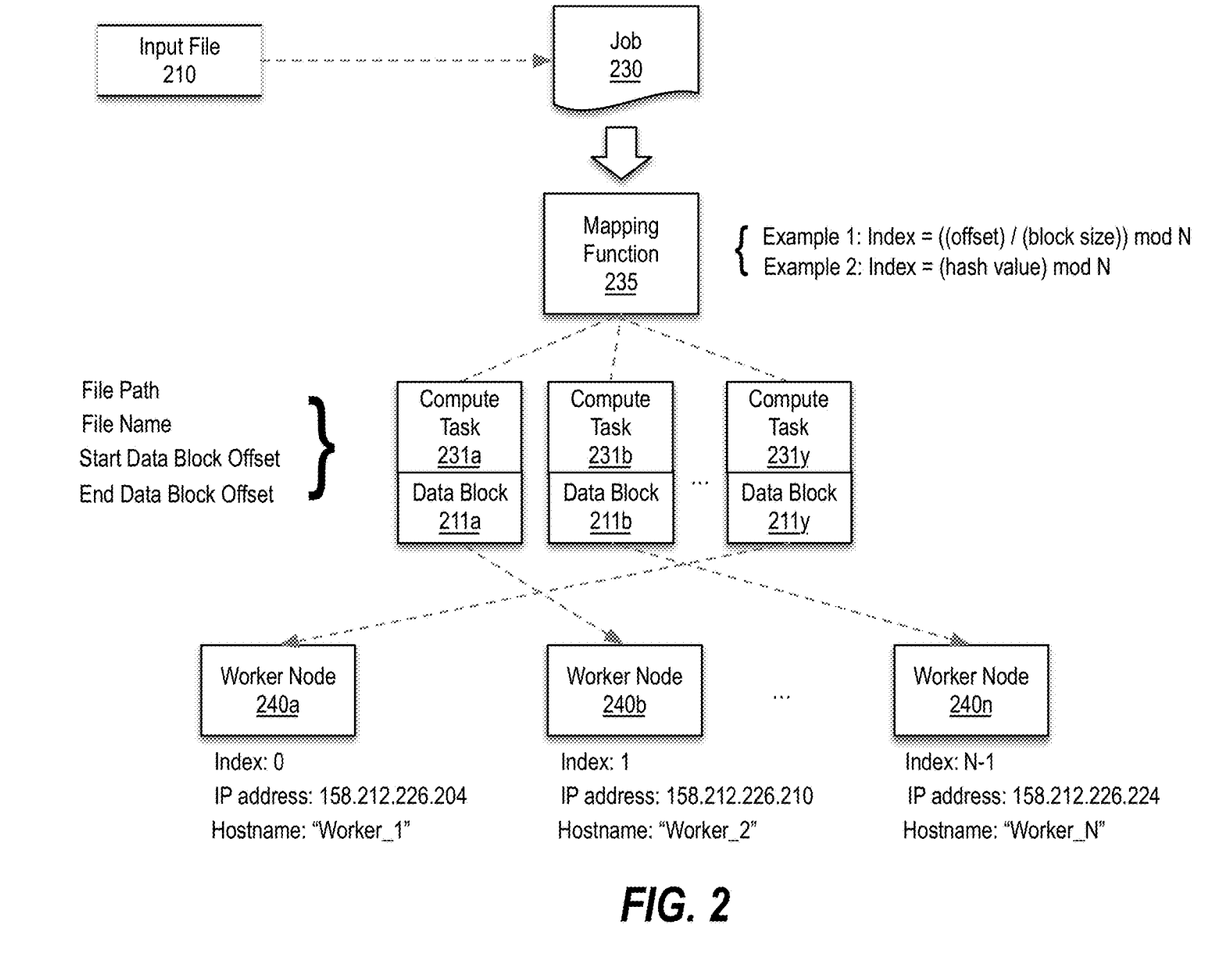
FIG. 2 shows a block diagram conceptually illustrating assignment of compute tasks to worker nodes in accordance with an example embodiment.

FIG. 2 shows a block diagram conceptually illustrating assignment of compute tasks 231a-y to worker nodes 240a-n in accordance with an example embodiment. Compute tasks 231a-y and worker nodes 240a-n may correspond to compute tasks 142a-n and worker nodes 140a-n, respectively, of FIG. 1. As noted above, in the context of a large scale data processing environment having separate compute and storage deployments, data blocks upon which the compute tasks operate are persisted remotely, for example, in one or more remote data lakes (e.g., data lake 155). As such, the traditional mechanism for achieving data locality, involving determining the address of the storage (data) node storing the data block that serves as input to a particular compute task and running the compute task on the determined storage node, does not work because, in a large scale data processing environment having separate compute and storage deployments, the compute tasks are not expected to be run on resources associated with the separate storage deployment (e.g., the remote data lake). Rather, the compute tasks are intended be run within the separate compute deployment (e.g., compute cluster 120). Meanwhile, to the extent the particular compute task were to be scheduled based on the address of the remote data lake (i.e., the location at which the input data block is stored), the resource manager (e.g., resource manager 130) would randomly assignment the particular compute task to one of the worker nodes due to the address of the remote data lake not representing an address of a worker node within the compute cluster (e.g., compute cluster 120). In view of the foregoing, a new approach is provided by various embodiments described herein to map the compute tasks to the worker nodes.

In various examples described herein, a mapping function (e.g., mapping function 235) in combination with local caching of data blocks is employed to achieve the benefits of data locality despite the fact that the data blocks are stored remotely. In the context of the present example, a job (e.g., job 230) and information regarding an input file (e.g., input file 210) associated with the job are provided to the mapping function. The input file may be specified by way of a Uniform Resource Identifier (URI), including, among other information, a scheme identifier (scheme_id), a file path (file_path), and a file name (file_name). For purposes of illustration, in the context of Azure, the scheme_id may be "absf" or "abfss" (e.g., representing use of the Azure Blob File System (ABFS) with or without a Transport Layer Security (TLS) connection, respectively), the file_path may specify a directory within a directory structure within the storage account, and the file_name may represent a name of the input file for the job. Those skilled in the art will appreciate other cloud storage APIs may use a different URI syntax.

The mapping function may determine a number of data blocks 211a-y represented by the input file based on the size of the input file and the block size (e.g., typically 128 Megabytes (MB) or 256 MB) and may then decompose the job into a corresponding number of compute tasks 231a-y. Various mechanisms may be used to map a number of items (e.g., compute tasks or data blocks) to a smaller number of buckets (e.g., the current number of worker nodes of a compute cluster). Without limitation, two examples are provided below that make use of modular arithmetic.

In one embodiment, a list of addresses (e.g., IP address/hostname) for all worker nodes in the compute cluster may be obtained from the resource manager (or other compute cluster management entity). In the context of the present example, the number of worker nodes is assumed to be N. An index, starting from zero and increasing to N−1, may then be assigned to each of the worker nodes by sorting them based on their respective IP addresses or hostnames. Subsequently, when data blocks are retrieved from the remote data lake, they may be mapped to the worker node having the same index by calculating the index for the data block based on an offset of the data block and N. For example, the index may be calculated in accordance with the following equation:

$$\text{Index} = ((\text{start offset of the data block})/(\text{block size})) \mod N \qquad \text{EQ \#1}$$

In an alternative embodiment, a hash algorithm may be used to map the data block to the worker node. Again, for purposes of illustration, the number of worker nodes is assumed to be N. For each worker node, a hash value may be calculated based on the IP address and/or the hostname of the worker node, for example, using a hash function or a cryptographic hash function. Non-limiting examples of suitable hash functions include a message-digest algorithm (e.g., MD5) or one or more of the Secure Hash Algorithms (e.g., SHA-1). Similarly, for each data block, a hash value may be calculated based on one or more selected portions of the URI (e.g., the scheme identifier, the file path, and the file name) and one or both of the start offset of the data block and the end offset of the data block. Then, an index may be calculated for each worker node and data block based on their respective hash values. For example, the index may be calculated in accordance with the following equation:

$$\text{Index} = (\text{hash value}) \bmod N \qquad \text{EQ \#2}$$

Subsequently, when data blocks are retrieved from the remote data lake, they may be mapped to the worker node having the same index. No two worker nodes should be identified by the same index. That is, the values selected to be hashed and the hash function should result in the hash value for each of the workers, mod N, being unique.

According to one embodiment, the mapping function may be implemented within the API (e.g., API 146*a-n*) of each worker node to facilitate mapping of data blocks retrieved from the remote data late to the appropriate worker node. The same mapping function may also be employed within the API 132 to cause compute tasks to be scheduled on worker nodes of the compute cluster to which the data blocks on which they operate are mapped. For example, in the context of an HDFS-compatible API, the mapping may be performed within the getFileBlockLocations( ) method, which returns an array containing hostnames, offset and size of portions of a given file.

In various examples described herein, each worker node may include or be associated with at least one processing resource (e.g., one or more central processing unit core(s), a Graphics Processing Unit, a microcontroller, a microprocessor, an application-specific integrated circuit (ASIC), a field programmable gate array (FPGA), etc.), a memory resource (e.g., random access memory (RAM), read-only memory (ROM), electrically erasable programmable read-only memory (EEPROM), etc.), and a storage resource (e.g., a storage device such as a hard disk drive, a solid state drive, flash memory, etc.). The various functional units (e.g., resource manager 130, worker nodes 140*a-n*, and data agents 145*a-n*) described herein and the processing described below with reference to the flow diagrams of FIGS. 3-4 may be implemented in the form of executable instructions stored on a machine readable medium and executed by a processing resource and/or by other types of electronic circuitry. For example, the processing may be performed by one or more virtual or physical computer systems of various forms, such as the computer system described with reference to FIG. 6 below.

Figure 3:
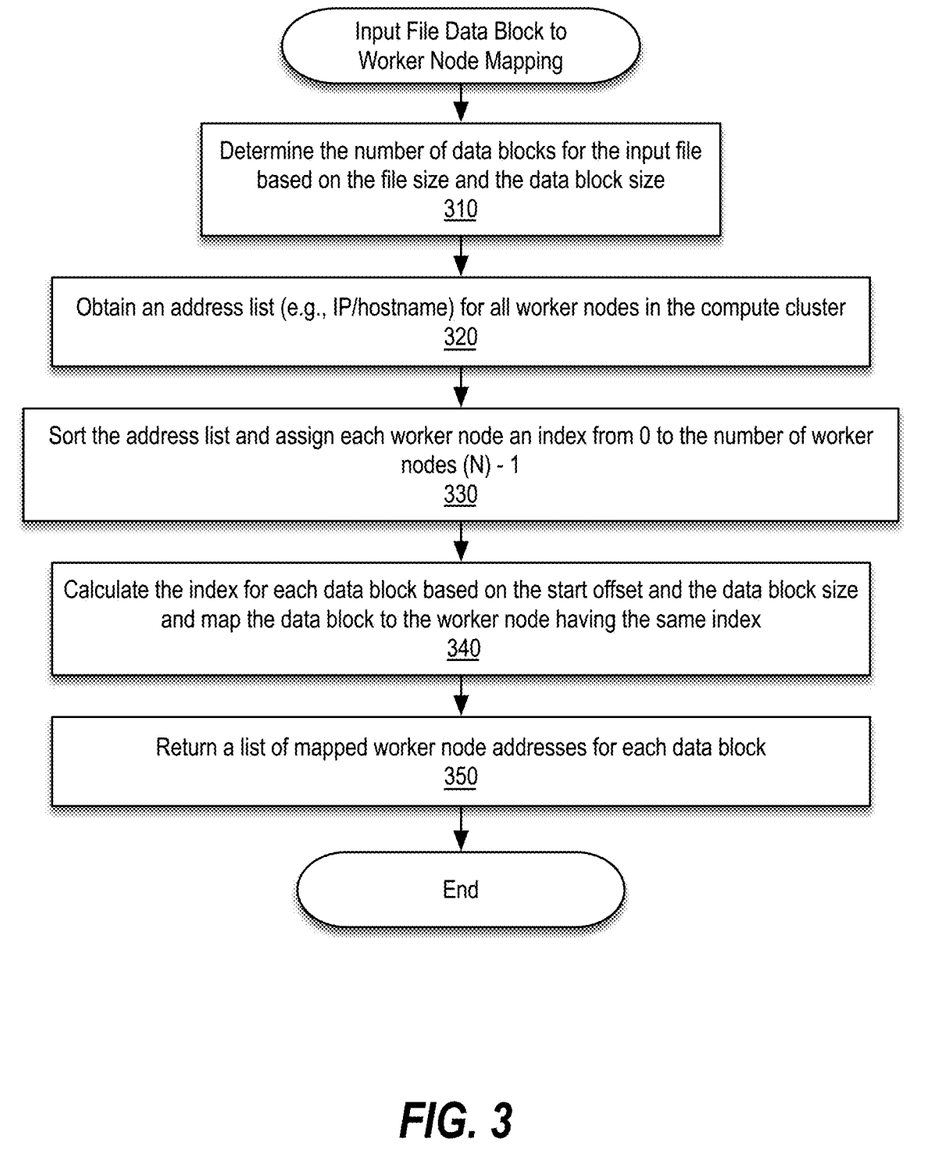
FIG. 3 shows a flow diagram illustrating mapping of input file data blocks to worker nodes in accordance with an example embodiment.

FIG. 3 shows a flow diagram illustrating mapping of input file data blocks to worker nodes in accordance with an example embodiment. In one embodiment, this mapping functionality is performed within a method of an API (e.g., API 132) of a data agent (e.g., data agent 132) responsive to a request from a resource manager (e.g., resource manager 130) as part of the resource manager scheduling compute tasks (compute tasks 231*a-y*) associated with a job (e.g., job 230) on appropriate worker nodes (e.g., worker nodes 240*a-n*). For example, assuming the API represents an HDFS-compatible API, the mapping may be performed within the getFileBlockLocations( ) method of the HDFS-compatible API.

At block 310, the number of data blocks for the input file is determined based on the file size and the data block size. According to one embodiment, information regarding the input file (e.g., input file 210) may be specified as part of the job. The size of the input file may be retrieved by the API from a remote data lake (e.g., data lake 155) in which the input file is stored.

At block 320, an address list is obtained for all worker nodes (e.g., worker nodes 140*a-n*) in the compute cluster (e.g., compute cluster 120). According to one embodiment, the API obtains the address list from the resource manager or other management entity for the compute cluster. The address list may include the IP addresses and/or the hostnames of all worker nodes in the compute cluster.

At block 330, the address list is sorted and each worker node is assigned an index. Depending upon the particular implementation, the address list may be sorted in ascending order or descending order the respective IP addresses or hostnames of the worker nodes. Then, assuming N worker nodes, an index may be assigned to each worker node, such as an index ranging from 0 to N−1.

At block 340, the index for each data block of the input file is calculated. In one embodiment, the index is calculated using EQ #1 described above based on the start offset of the data block and the block size.

At block 350, a list of mapped worker node addresses for each data block of the input file is returned.

As noted above, there are a variety of approaches that may be used to map compute tasks and the corresponding data blocks of the input file on which they operate to the same worker node. While in the context of the present example, a particular approach has been described with reference to the use of EQ #1, one of many alternative approaches may involve the use of a hash function and EQ #2. For purposes of illustration, two non-limiting example mapping functions have been described above with reference to FIG. 2.

Meanwhile, it is to be noted there may be some situations in which a particular worker node to which a compute task would ordinarily be assigned by the particular mapping function employed is purposefully assigned to another worker node. For example, a given worker node to which the compute task is assigned may not have sufficient resources (e.g., compute, memory, and/or storage) to support execution of an additional compute task. In such cases, the compute task may be assigned to an alternative worker node, which may be selected at random or by other means.

Figure 4:
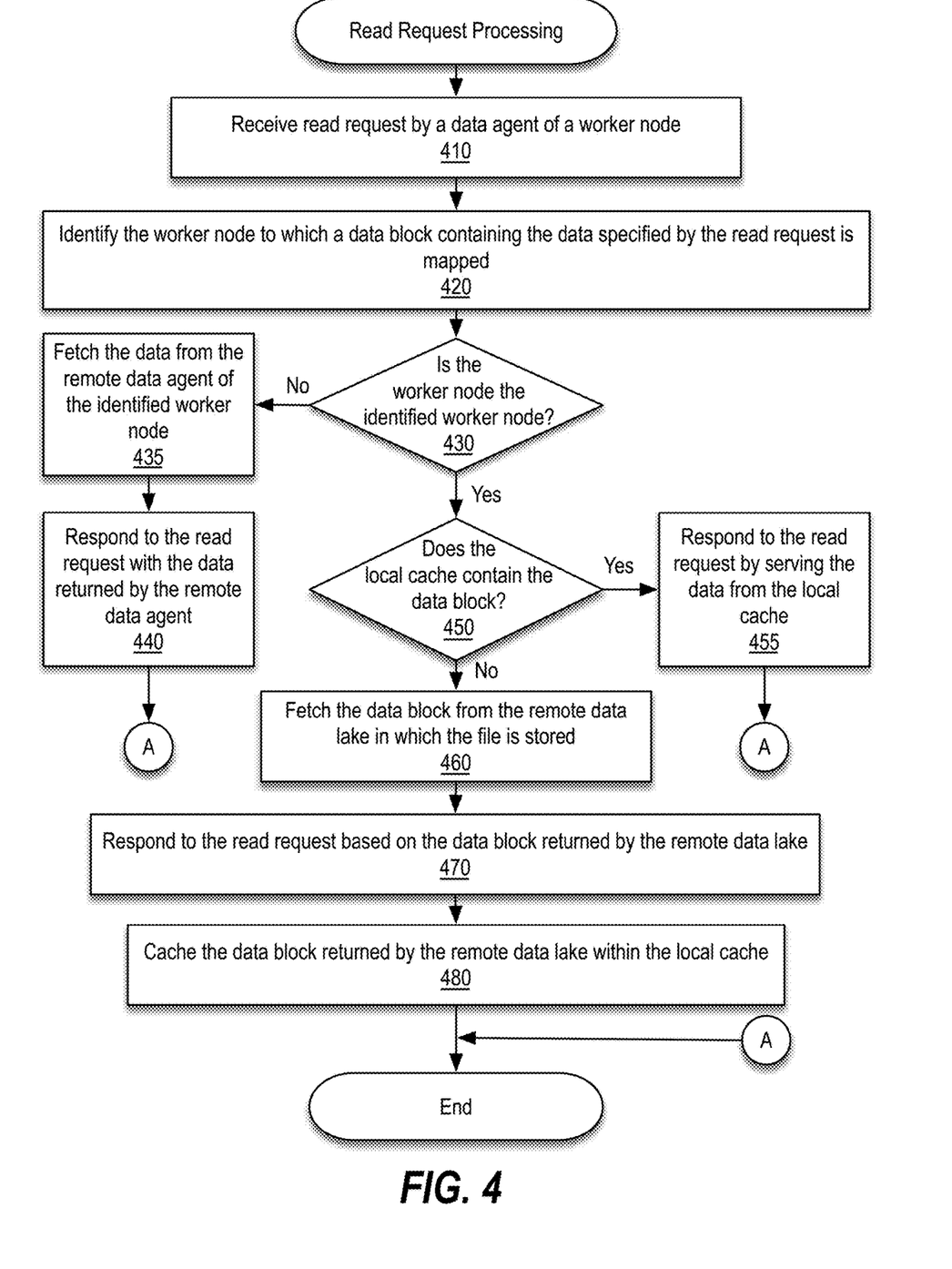
FIG. 4 shows a flow diagram illustrating read request processing in accordance with an example embodiment.

FIG. 4 shows a flow diagram illustrating read request processing in accordance with an example embodiment. In one embodiment, the average latency of data access requests may be reduced by caching data blocks within the worker nodes to which they are mapped. In particular, the caching approach may involve performing local caching by each data agent (e.g., one of data agents 145*a-n*) of each worker node (e.g., worker nodes 140*a-n*) of a compute cluster (e.g., compute cluster 120) in such a manner so as to minimize or limit the number of cached copies of any given data block within the compute cluster. Specifically, in an example, the number of cached copies may be limited to one, and the cached copy, if one exists within the compute cluster at a given time, will be on the worker node to which the given data block maps.

At block 410, the data agent of a worker node receives a read request via the API exposed by the data agent. The read request may be from a compute task running on the same worker node or the read request may be from a remote data agent running on a different worker node. The read request may specify the range of data desired to be accessed by the compute task in terms of a start offset and an end byte offset from the beginning of an input file (e.g., input file 210) that has previously been opened.

At block 420, the worker node to which a data block corresponding to the read request is mapped is identified. Based on the start and end byte offsets, the corresponding data block within the input file may be determined. Then, the index of the data block, calculated with the same mapping function used during compute task scheduling (e.g., calculated based on EQ #1 or EQ #2), may be used to identify the worker node to which the data block at issue maps.

At decision block 430, it is determined whether the worker node is the identified worker node. If so, then processing continues with decision block 450; otherwise processing branches to block 435.

At block 435, it was determined at decision block 430 that the identified worker node (the worker node to which the data block to be read is mapped) is a worker node other than the one on which the data agent is running. In the context of the present example, because the compute cluster is limited to caching a single copy of the data block, to the extent the data block is currently cached, it will be cached on the other worker node, for example, by the remote data agent running on the other worker node. As such, the data may be fetched from the identified worker node. In one embodiment, the local data agent may fetch the data at issue by invoking the read method of the API of the remote data agent running on the identified worker node. The remote data agent may retrieve the data at issue from its local cache, or from the remote data, as appropriate.

At block 440, the local data agent responds to the read request with the data returned by the remote data agent and read request processing is complete.

At decision block 450, it was determined at decision block 430 that the identified worker node is the worker node on which the data agent is running. As such, a further determination is made regarding whether the local cache (e.g., one of caches 147a-n) contains the data block. If so, processing branches to block 455; otherwise, processing continues with block 460. In one embodiment, this further determination may be made with reference to the start and end offset of the data block and metadata stored in the local cache. A non-limiting example of a cache is described below with reference to FIG. 5. As explained further below with reference to FIG. 5, determining whether to serve the data from the local cache may involve additional processing, for example, relating to staleness of the cached data and refreshing of stale cached data.

At block 455, the data agent responds to the read request by serving the data from the local cache and read request processing is complete.

At block 460, it was determined at decision block 450 that the local cache does not contain the data block. As such, the data agent fetches the data bock from the remote data lake in which the input file at issue is remotely stored.

At block 470, the data agent responds to the read request by based on the data block returned by the remote data lake.

At block 480, the data block returned by the remote data lake may be cached in the local cache for subsequent use and read request processing is complete.

Although the operations in current example are described and/or depicted in a particular order, the order of the operations can be modified. Thus, the illustrated embodiments can be performed in a different order, and some operations may be performed in parallel. For example, as those skilled in the art will appreciate, the order of performance of blocks 455 and 460 may be reversed. As such, the numbering of the operations presented is for the sake of clarity and is not intended to prescribe an order of operations in which the various operations must occur. Additionally, in some embodiments, operations from various flow diagrams may be utilized in a variety of combinations.

Figure 5:
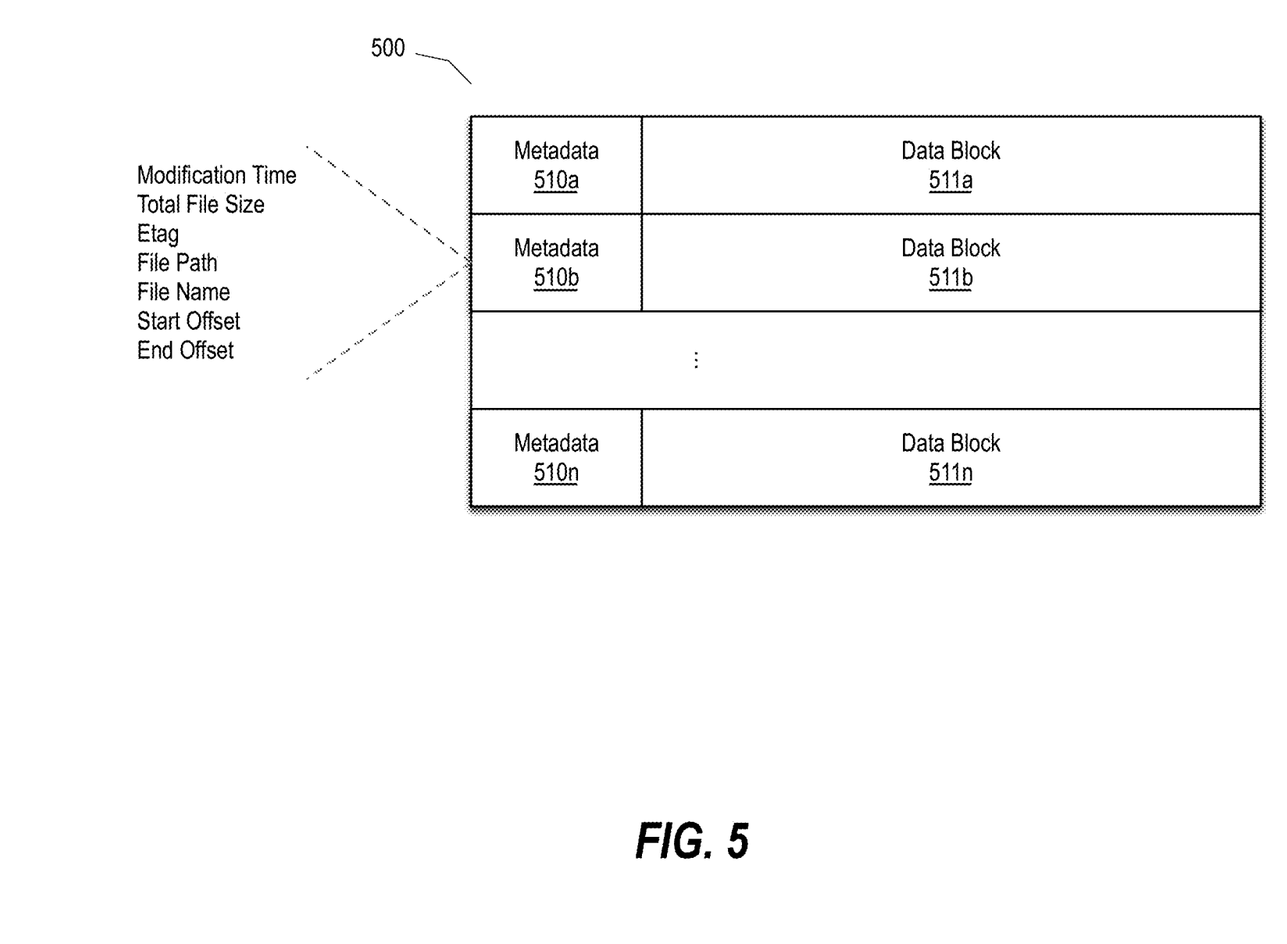
FIG. 5 shows a block diagram conceptually illustrating a cache in accordance with an example embodiment.

FIG. 5 shows a block diagram conceptually illustrating a cache 500 in accordance with an example embodiment. In the context of the present example, the cache 500 includes multiple entries, each including a data block (e.g., data blocks 511a-n) and corresponding metadata (e.g., metadata 510a-n). The metadata may include one of more of a modification time, a total file size, an Entity Tag (ETag), a file path, a file_name, a start offset, and an end offset. An ETag is an identifier assigned by a Web server to a specific version of a resource found at a URL. If the resource representation at that URL changes, a new and different ETag is assigned. As such, one of more of the total file size, the modification time, and the Etag may be evaluated by a data agent (e.g., one of data agents 145a-n) against the remote data lake (e.g., data lake 155) to evaluate whether the cached data is stale before returning cached data to a requester. For example, if the remote data lake provides a file system interface (e.g., HDFS or NFS), the data agent can check the file modification time and file size against the remote data lake. If either have changed, the cached data may be treated as stale and the data agent may evict the cached data and fetch a fresh version from the remote data lake. If the remote data lake provides a web services or cloud storage API, the data agent can check the file modification time or the ETag against the remote data lake via a Hypertext Transfer Protocol (HTTP) request. If either has been changed, the cached data may be treated as stale and the data agent may evict the cached data and fetch a fresh version from the remote data lake. While in the context of the present example, each cache entry is shown containing an entire data block, it is to be appreciated that the cache entries may be at a finer or more course granularity than a data block depending upon the particular implementation. Similarly, when data is evicted from the cache 500 and refreshed from the remote data lake, such processing may be performed at the resolution of a data block, a portion of a data block, or multiple data blocks depending upon the particular implementation.

Figure 6:
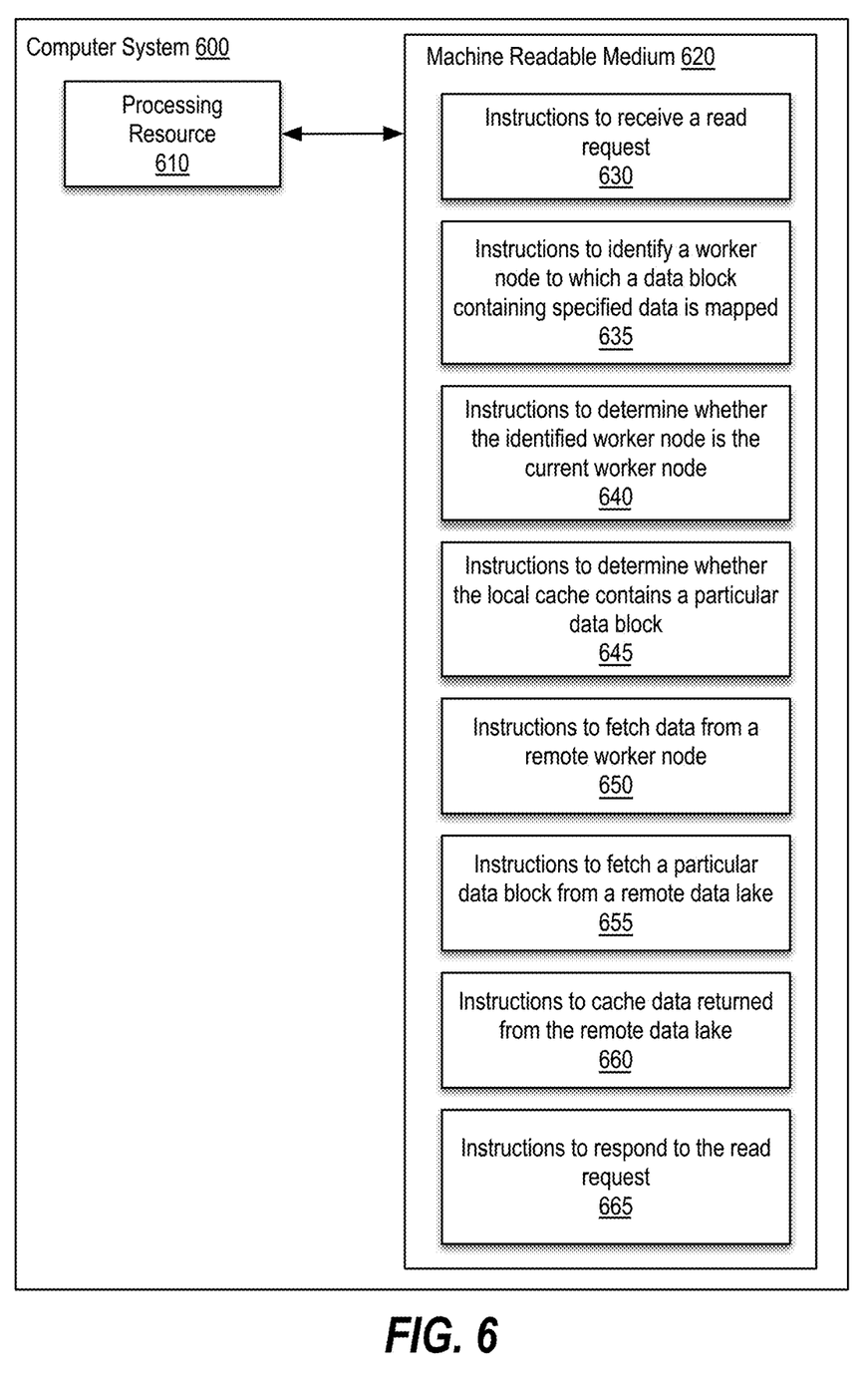
FIG. 6 shows a block diagram of an example computer system.

FIG. 6 shows a block diagram of a computer system in accordance with an embodiment. In the example illustrated by FIG. 6, computer system 600 includes processing resource 610 coupled to non-transitory, machine readable medium 620 encoded with instructions to perform one or more of the various methods described herein or implement one or more of the functional units described herein. Processing resource 610 may include a microcontroller, a microprocessor, CPU core(s), GPU core(s), an ASIC, an FPGA, and/or other hardware device suitable for retrieval and/or execution of instructions from machine readable medium 620 to perform the functions related to various examples described herein. Additionally or alternatively, processing resource 610 may include electronic circuitry for performing the functionality of the instructions described herein.

Machine readable medium 620 may be any medium suitable for storing executable instructions. Non-limiting examples of machine readable medium 620 include RAM, ROM, EEPROM, flash memory, a hard disk drive, an optical disc, or the like. Machine readable medium 620 may be disposed within computer system 600, as shown in FIG. 6, in which case the executable instructions may be deemed "installed" or "embedded" on computer system 600. Alternatively, machine readable medium 620 may be a portable (e.g., external) storage medium, and may be part of an "installation package." The instructions stored on machine readable medium 620 may be useful for implementing at least part of the methods described herein.

In the context of the present example, machine readable medium 620 is encoded with a set of executable instructions 630-635. It should be understood that part or all of the executable instructions and/or electronic circuits included within one block may, in alternate implementations, be included in a different block shown in the figures or in a different block not shown.

Instructions 630, upon execution, may cause processing resource 610 to receive a read request. In one embodiment, instructions 630 may be useful for performing block 410 of FIG. 4.

Instructions 635, upon execution, may cause processing resource 610 to identify a worker node to which a data block containing specified data is mapped. In one embodiment, instructions 635 may be useful for performing block 420 of FIG. 4.

Instructions 640, upon execution, may cause processing resource 610 to determine whether the identified worker node is the current worker node. In one embodiment, instructions 640 may be useful for performing decision block 430 of FIG. 4.

Instructions 645, upon execution, may cause processing resource 610 to determine whether the local cache of the current worker node contains a particular data block. In one embodiment, instructions 645 may be useful for performing decision block 450 of FIG. 4.

Instructions 650, upon execution, may cause processing resource 610 to fetch data from a remote data agent of a different worker node (e.g., one identified the worker node to which a data block containing the data at issue is mapped). In one embodiment, instructions 650 may be useful for performing block 435 of FIG. 4.

Instructions 655, upon execution, may cause processing resource 610 to fetch a particular data block from a remote data lake. In one embodiment, instructions 650 may be useful for performing block 460 of FIG. 4.

Instructions 660, upon execution, may cause processing resource 610 to cache the fetched data block within the local cache. In one embodiment, instructions 660 may be useful for performing block 480 of FIG. 4.

Instructions 665, upon execution, may cause processing resource 610 to respond to the read request. In one embodiment, instructions 665 may be useful for performing one or more of blocks 440, 455, and 470 of FIG. 4.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A method comprising:
receiving, by a first data agent running on a first worker node of a compute cluster of a large scale data processing environment, a read request from a compute task running on the first worker node, wherein the compute task was scheduled to run on the first worker node based on a mapping function;
identifying, by the first data agent, a particular worker node of the compute cluster to which a data block containing data specified by the read request is mapped based on the mapping function, wherein the particular worker node is assigned a worker node index, wherein the data block is assigned a data block index, and wherein the particular worker node is mapped by the mapping function to the data block so that the worker node index of the particular worker node is the same as the data block index of the data block;
based on identifying the first worker node as the particular worker node:
determining, by the first data agent, whether a local cache exists within the first worker node that contains the data block;
based on said determining being affirmative, responding, by the first data agent, to the read request by serving the data from the local cache;
based on said determining being negative:
fetching, by the first data agent, the data block from a remote data lake;
responding, by the first data agent, to the read request by serving the data from the fetched data block; and
caching the fetched data block within the local cache; and
based on identifying a second worker node of the compute cluster as the particular worker node:
fetching the data from a second data agent running on the second worker node; and
responding to the read request by returning the data fetched from the second data agent.

2. The method of claim 1, wherein the first data agent provides a Hadoop File System (HDFS)-compatible Application Programming Interface (API) through which the read request is received from the compute task.

3. The method of claim 1, wherein the first data agent exposes a first API through which compute tasks running on the first worker node make data access requests and the remote data lake exposes a second API through which data blocks of files stored therein are accessible.

4. The method of claim 1, wherein the method further comprises prior to said serving the data from the local cache:
evaluating, by the first data agent, whether the data in the local cache is stale;
when said evaluating is affirmative:
evicting the data from the local cache; and
fetching the data from the remote data lake.

5. The method of claim 4, wherein said evaluating further comprises:
when the remote data lake provides a file system interface, checking a modification time and a size of a file containing the data against the remote data lake via the file system interface; and
when the remote data lake provides a web services interface, checking the modification time or an Entity Tag (ETag) associated with the data via the web services interface.

6. A system comprising:
a processing resource; and
a non-transitory computer-readable medium, storing instructions that when executed by the processing resource cause the processing resource implementing a first data agent to:
receive a read request from a compute task running on a first worker node in a compute cluster;
identify a particular worker node of the compute cluster to which a data block containing data specified by the read request is mapped, wherein the particular worker node is assigned a worker node index, wherein the data block is assigned a data block index, and wherein the particular worker node is mapped by the mapping function to the data block so that the worker node index of the particular worker node is the same as the data block index of the data block;
based on the first worker node being identified as the particular worker node:

determine whether a local cache exists within the first worker node that contains the data block;
based on an affirmative determination, respond to the read request by serving the data from the local cache;
based on a negative determination:
fetch the data block from a remote data lake;
respond to the read request by serving the data from the fetched data block; and
cache the fetched data block within the local cache; and
based on a second worker node of the compute cluster being identified as the particular worker node:
fetching the data from a second data agent running on the second worker node; and
responding to the read request by returning the data fetched from the second data agent.

7. The system of claim 6, wherein a common mapping function is used to both (i) schedule compute tasks on worker nodes of the compute cluster and (ii) map data blocks from the remote data lake to the worker nodes.

8. The system of claim 6, wherein the first data agent provides a Hadoop File System (HDFS)-compatible Application Programming Interface (API) through which the read request is received from the compute task.

9. The system of claim 6, wherein the first data agent exposes a first API through which compute tasks running on the first worker node make data access requests and the remote data lake exposes a second API through which data blocks of files stored therein are accessible.

10. The system of claim 6, wherein the instructions further cause the processing resource to prior to serving the data from the local cache:
evaluate, by the first data agent, whether the data in the local cache is stale; and
based on an affirmative evaluation:
evict the data from the local cache; and
fetch the data from the remote data lake.

11. The system of claim 10, wherein evaluation of the data in the local cache further comprises:
when the remote data lake provides a file system interface, compare a modification time and a size of a file containing the data against the remote data lake via the file system interface; and
when the remote data lake provides a web services interface, compare the modification time or an Entity Tag (ETag) associated with the data via the web services interface.

12. A non-transitory machine readable medium storing instructions that when executed by a processing resource of a compute cluster operating within a large scale data processing environment cause the processing resource implementing a first data agent to:
receive a read request from a compute task running on a first worker node of the compute cluster;
identify a particular worker node of the compute cluster to which a data block containing data specified by the read request is mapped, wherein the particular worker node is assigned a worker node index, wherein the data block is assigned a data block index, and wherein the particular worker node is mapped by the mapping function to the data block so that the worker node index of the particular worker node is the same as the data block index of the data block;
based on the particular worker node being identified as the first worker node:
determine whether a local cache exists within the first worker node that contains the data block;
based on an affirmative determination, respond to the read request by serving the data from the local cache;
based on a negative determination:
fetch the data block from a remote data lake;
respond to the read request by serving the data from the fetched data block; and
cache the fetched data block within the local cache; and
based on a second worker node of the compute cluster being identified as the particular worker node:
fetching the data from a second data agent running on the second worker node; and
responding to the read request by returning the data fetched from the second data agent.

13. The non-transitory machine readable medium of claim 12, wherein a common mapping function is used to both (i) schedule compute tasks on worker nodes of the compute cluster and (ii) map data blocks of the remote data lake to the worker nodes.

14. The non-transitory machine readable medium of claim 12, wherein the compute cluster comprises a cluster of a big data framework.

15. The non-transitory machine readable medium of claim 14, wherein the big data framework comprises Hadoop.

16. The non-transitory machine readable medium of claim 12, wherein the first data agent provides a Hadoop File System (HDFS)-compatible Application Programming Interface (API) through which the read request is received from the compute task.

17. The non-transitory machine readable medium of claim 12, wherein the first data agent exposes a first API through which compute tasks running on the first worker node make data access requests and the remote data lake exposes a second API through which data blocks of files stored therein are accessible.

18. The non-transitory machine readable medium of claim 12, wherein the instructions further cause the processing resource to prior to serving the data from the local cache:
evaluate, by the first data agent, whether the data in the local cache is stale; and
based on an affirmative evaluation:
evict the data from the local cache; and
fetch the data from the remote data lake.

19. The non-transitory machine readable medium of claim 18, wherein evaluation of the data in the local cache further comprises:
when the remote data lake provides a file system interface, compare a modification time and a size of a file containing the data against the remote data lake via the file system interface; and
when the remote data lake provides a web services interface, compare the modification time or an Entity Tag (ETag) associated with the data via the web services interface.

* * * * *